Aug. 30, 1960 H. FISCHER 2,950,795
ELECTROMAGNETIC CLUTCH WITH FRICTION
AND FORM LOCKING MEMBERS
Filed Nov. 26, 1957
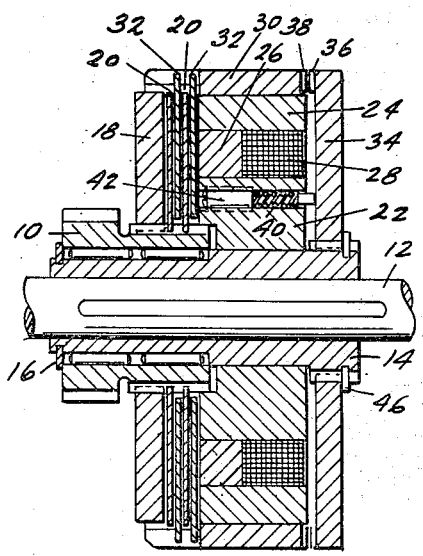
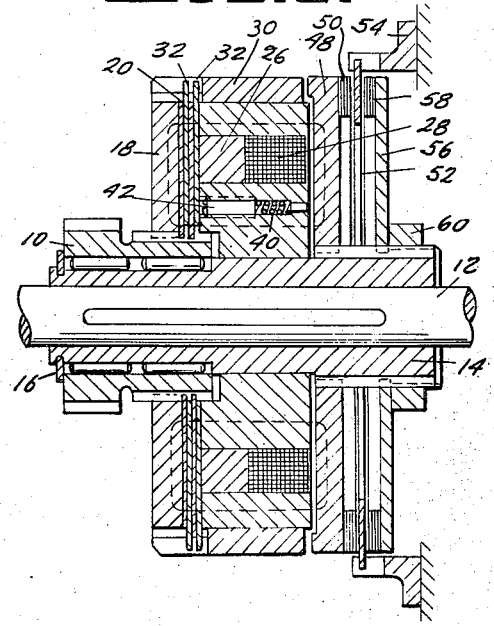
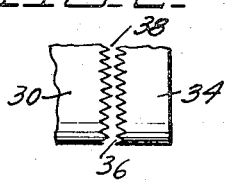
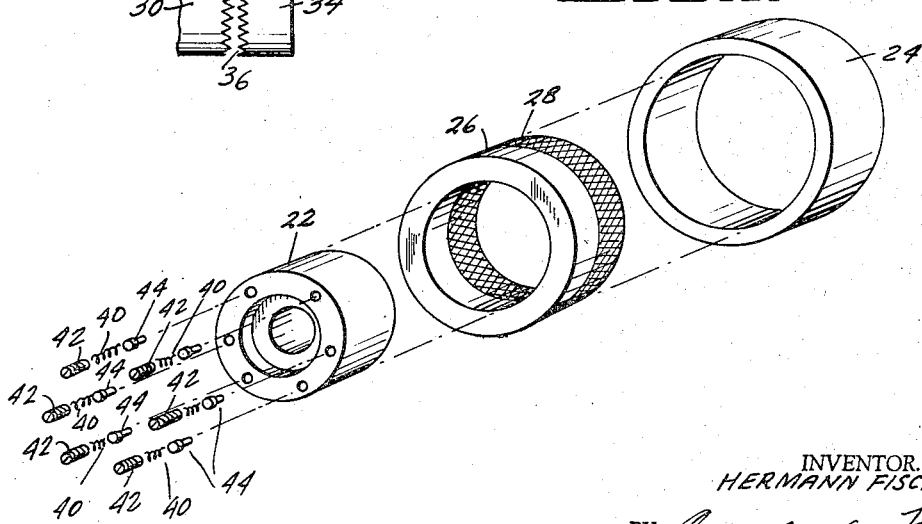
INVENTOR.
HERMANN FISCHER
BY
ATTORNEYS United States Patent Office 2,950,795
Patented Aug. 30, 1960

2,950,795

ELECTROMAGNETIC CLUTCH WITH FRICTION AND FORM LOCKING MEMBERS

Hermann Fischer, Friedrichshafen-Fischbach, Germany, assignor to I-T-E Circuit Breaker Company, Philadelphia, Pa., a corporation of Pennsylvania Filed Nov. 26, 1957, Ser. No. 699,058

3 Claims. (Cl. 192—53)

This invention relates to a novel combination of friction clutch members and form-locking clutch members in a unitary clutch of novel construction.

The novel clutch is preferably electromagnetically energized, although other energizing means could be utilized, and when so energized, includes a novel magnet structure. More specifically, the magnet structure comprises a first and second concentric ring of magnetic material of larger and smaller radii respectively which are separated by an interposed energizing coil and non-magnetic spacing ring. This novel structure provides simplicity and economy to the magnet assembly.

A friction clutch member such as a plurality of interleaved laminations alternately connected to the driving and driven member respectively are then placed on one side of the magnet assembly to be operated thereby and a form-locking clutch member for forming a relatively rigid connection between the driving and driven member is placed on the other side of the magnet assembly.

These clutching members are then so connected and operated that when the driving and driven members are to be connected, the form-locking clutch will first connect one of the driving or driven members to an intermediate member such as the magnet body, and the friction clutch member will thereafter gradually complete the connection.

When the driving and driven members are to be disconnected, the form-locking clutch member will effect the disengagement immediately, without waiting for the time lag requisite in disengaging the friction members.

If desired, the form-locking clutch can cooperate with a braking means which immediately brakes the operation of the driven member.

Accordingly, a primary object of my invention is to provide a novel clutch device wherein a first clutch operation proceeds through a gradual engaging and disengaging member while a second clutch operation proceeds through a rapid clutch engaging and disengaging member.

Another object of my invention is to provide a novel clutch having gradual clutching characteristics and quick unclutching characteristics.

A further object of my invention is to provide a novel clutch having a friction clutch member and a form-locking clutch member wherein the clutching members operate through an intermediate member to selectively connect and disconnect a driving and driven member.

A still further object of my invention is to construct a clutch magnet of a first and second ring which are concentrically spaced and positioned by an energizing coil and spacer ring.

These and other objects of my invention will become apparent from the following description when taken in conjunction with the drawings in which:

Figure 1 shows a first embodiment of my novel clutch.

Figure 2 illustrates the teeth used in the embodiment of Figure 1 for the form-locking clutch member.

Figure 3 shows a second embodiment of my novel invention where the form-locking member cooperates with a braking means.

Figure 4 shows an exploded perspective view of the novel magnet of Figures 1 and 3.

Referring now to Figure 1 which shows a first embodiment of my invention, a driving member 10 is to be selectively coupled and de-coupled with respect to a driven shaft 12.

Driven shaft 12 has a bushing 14 secured thereto in any desired manner and bushing 14 carries the driving member 10 on its left-hand side with member 10 being rotatable with respect to bushing 14. The driving member or first member 10 is therefore rotatable with respect to the driven member or second member 12, and shaft 12 is prevented from moving out of engagement with driving member 10 by means of the end ring 16. Driving member 10 has an armature member 18 of magnetic material and disk-type laminations 20 splined thereto whereby armature 18 and laminations 20 are rotatable with driving member 10, but are axially movable with respect therewith.

The clutch magnetic body is then formed, as seen in Figures 1 and 4, of a first and second concentric ring 22 and 24 of magnetic material, these rings being radially spaced from one another by a non-magnetic spacer 26 and energizing coil 28.

The outer ring 24 then has a non-magnetic bushing 30 axially secured thereto, and rotatable with respect thereto, and which has a plurality of projecting fingers which carry outer laminations 32 for cooperating with inner laminations 20. For purposes of simplicity, the precise manner in which bushing 30 is connected to ring 24 has not been shown, but it will be obvious to those skilled in the art that means such as retaining rings carried by ring 24 could retain bushing 30 in its desired axial position.

The above described structure forms the friction clutch portion of my novel clutch device wherein energization of coil 28 will cause armature 18 to move to the right to thereby force laminations 32 and 20 into engagement with one another and thus fasten the intermediate member of the clutch, or bushing 30, to the armature 18 and driving member 10.

I then provide a form-locking clutch on the other side of the magnet body of Figures 1 and 4 which, as is best seen in Figures 1 and 3, is comprised of a form-locking clutch member 34 which has teeth 36 formed in its outer periphery.

Teeth 36 of the clutch member 34 are so disposed as to cooperate with meshable teeth 38 formed in the outer periphery of the non-magnetic bushing 30 which surrounds the magnet body assembly. Normally, teeth 36 and 38 are maintained disengaged by a plurality of biasing means best seen in Figure 4 which include a spring member 40 which has its left end adjustably positioned by screw member 42, and has its right-hand end bearing against a movable member 44. A plurality of these assemblies, including members 40, 42 and 44, are positioned in a plurality of respective apertures in magnet body 22 in such a manner that member 44 will be biased into engagement with the left-hand surface of clutch member 34. This will cause member 34 which is splined to bushing 14 so as to be rotatable with bushing 14 but axially movable with respect thereto, to normally be biased into engagement with end stop member 46 and teeth 36 and 38 will be disengaged.

In operation of the device of Figure 1, when the energizing coil 28 is energized a magnetic flux will circulate from the ring member 24, armature 18, ring member 22 and clutch member 34. Thus, the armature member 18 will be moved to the right to tend to compress laminations 20 and 32, while the clutch member 34 will be moved to the left. Once the clutch member 34 moves to the left, its teeth 36 immediately engage teeth 38 of rotatable bushing 30. Thus, this first step immediately connects laminations 32 to the driven member 12 through clutch member 34.

After this immediate connection, the armature member 18, which slowly compresses laminations 20 and 32, will cause torque to be smoothly transferred from laminations 20 to laminations 32 whereby driving member 10 is gradually connected to driven member 12.

When it is desired to disengage driving member 10 from driven member 12, the energizing coil 28 is de-energized whereby clutch member 34 is immediately driven to the right by biasing springs 40 so that immediate disengagement occurs between bushing 30 and driven member 12 and, therefore, disengagement occurs between the driving and driven members.

Accordingly, my novel clutch member achieves the novel result of having a gradual connection between the driving and driven member while still affording an immediate disconnection between these members.

A second embodiment of my invention is set forth in Figure 3 which is identical to that of Figure 1 so far as the friction clutch portion is concerned.

Clearly, however, the friction clutch portion of my device could be shown as being of any well known type of clutch device. However, I choose to show the device in Figure 3 as having a friction type electromagnetic clutch member similar to that of Figure 1 where similar numerals are identified in similar components.

Figure 3 differs from Figure 1 in the form-locking clutch portion which now includes a clutch member 48 which is similar to clutch member 34 of Figure 1, with the exception of not having a tooth construction. Conversely, clutch member 48 is provided with a brake lining 50 on one end thereof which cooperates with a disk 52 which is held stationary against rotation by fixed support member 54.

If desired, a second armature member such as brake disk 56 may be provided on the other side of disk 52 and have a brake lining 58 associated therewith.

The operation of the device of Figure 3 is substantially identical to that of Figure 1, the exception being that responsive to de-energization of coil 28, the clutch member 48 will be driven to the right by its springs 40 to cause brake lining 50 to engage the braking disk 52 and, therefore, cause a positive braking action for driven member 12. The axial portion of braking disk 56 with respect to bushing 14 is axially limited by a lock nut 60. Braking of shaft 12 may be achieved by moving the shaft to the left or by a motion of disk 56 to the left by electromagnetic means.

Although I have described preferred embodiments of my novel invention, many variations and modifications will now be obvious to those skilled in the art, and I prefer therefore to be limited not by the specific disclosure herein but only by the appended claims.

I claim:

1. A clutch device for selectively coupling and decoupling a first and second rotatable member; said clutch device comprising a first clutch member characterized by gradual clutching and declutching operation and a second clutch member characterized by rapid clutching and declutching operation; an intermediate rotatable member operatively connectable between said first and second rotatable members; said intermediate rotatable member being a ring; said first clutch member operatively connecting said intermediate member to said first rotatable member when operated to a clutch engaged position; said second clutch member operatively connecting said intermediate member to said second rotatable member when operated to a clutch engaged position; said first clutch member being an electromagnetic clutch having interleaved laminations connected between said first rotatable member and said intermediate member and said second clutch member comprising a form-locking clutch; said form-locking clutch and said electromagnetic clutch being operable to said clutch engaged position responsive to the generation of a magnetic field by magnetic structure means; said form locking clutch and said electromagnetic clutch being positioned on opposing sides of said magnetic structure means.

2. A clutch device for selectively coupling and decoupling a first and second rotatable member; said clutch device comprising a first clutch member characterized by gradual clutching and declutching operation and a second clutch member characterized by rapid clutching and declutching operation; an intermediate rotatable member operatively connectable between said first and second rotatable members; said intermediate rotatable member being a ring; said first clutch member operatively connecting said intermediate member to said first rotatable member when operated to a clutch engaged position; said second clutch member operatively connecting said intermediate member to said second rotatable member when operated to a clutch engaged position; said first clutch member being an electromagnetic clutch having interleaved laminations connected between said first rotatable member and said intermediate member and said second clutch member comprising a form-locking clutch; said form-locking clutch and said electromagnetic clutch being operable to said clutch engaged position responsive to the generation of a magnetic field by magnetic structure means; said magnetic structure means being disposed between said electromagnetic clutch and said form-locking clutch and being concentric with respect to said intermediate member.

3. A clutch device for selectively coupling and decoupling a first and second rotatable member; said clutch device comprising a first clutch member characterized by gradual clutching and declutching operation and a second clutch member characterized by rapid clutching and declutching operation; an intermediate rotatable member operatively connectable between said first and second rotatable members; said intermediate rotatable member being a ring; said first clutch member operatively connecting said intermediate member to said first rotatable member when operated to a clutch engaged position; said second clutch member operatively connecting said intermediate member to said second rotatable member when operated to a clutch engaged position; said first clutch member being an electromagnetic clutch connected between said first rotatable member and said intermediate member and said second clutch member comprising a form locking clutch; said form locking clutch and said electromagnetic clutch being operable to said clutch engaged positions responsive to the generation of a magnetic field by magnetic structure means; said form locking clutch and said electromagnetic clutch being positioned on opposing sides of said magnetic structure means.

References Cited in the file of this patent

UNITED STATES PATENTS

| | | |
|---|---|---|
| 828,528 | Balcome | Aug. 14, 1906 |
| 1,470,961 | Creveling | Oct. 16, 1923 |
| 1,638,890 | Staege | Aug. 16, 1927 |
| 2,070,813 | Stearns et al. | Feb. 16, 1937 |
| 2,435,050 | Nardone | Jan. 27, 1948 |
| 2,612,248 | Feiertag | Sept. 30, 1952 |
| 2,861,665 | Passler | Nov. 25, 1958 |
| 2,875,876 | Rudisch | Mar. 3, 1959 |